United States Patent Office 3,139,681
Patented July 7, 1964

3,139,681
METHOD OF MANUFACTURING NUCLEAR REACTOR FUEL ELEMENTS
David E. Goslee, Towson, and Louis Frank and Aldo C. Pezzi, Baltimore, Md., assignors to Martin-Marietta Corporation, a corporation of Maryland
No Drawing. Filed May 13, 1958, Ser. No. 734,837
3 Claims. (Cl. 29—474.3)

This invention relates to an improved method for the manufacture of flat plate nuclear fuel elements whereby an exceptional fuel element is obtained in an economical and efficient manner.

Heretofore flat plate fuel elements for nuclear reactors were prepared by pre-forming a mixture of metal and fissionable material into a compact, and framing a metal clad around the compact. The framed compact was then processed into the final product. By this procedure, an undesirable amount of time is consumed in the preparation and framing of the compact, and furthermore, the bond between the cermet core and the metal clad in the product is not entirely satisfactory. Defects in the bond between the cermet core and metal clad may be serious, because of the consequent reduction in the life of the fuel element. Where a poor bond exists, heat transfer is poor, with the result that a hot spot is formed and the life of the fuel element is shortened.

Therefore, an object of this invention is to provide a fuel element of the flat plate type which has an excellent bond between the core and clad.

Another object of this invention is to provide an improved method of producing flat plate fuel elements whereby a substantial reduction in cost of manufacture is effected and an excellent bond between the core and clad is obtained.

Other objects and advantages will become apparent from the following description and explanation thereof.

By means of the process of this invention, a mixture of matrix metal and fissionable material is placed in a hollow elongated clad member, the ends of the member are closed with clad metal to provide complete encasement of the mixture, the resultant clad member is formed into a flat plate of suitable thickness by alternate rolling or pressing and heat treatments, and then the flat plate member is sintered in the absence of oxygen.

As previously indicated, the manufacture of flat plate fuel elements was accomplished heretofore by preparing a flat core of metal and fissionable material and then fabricating a "pictureframe" or envelope of clad into which the core would be placed for subsequent fabrication into the finished product. It takes substantially longer to manufacture a fuel element by this conventional method than by the present invention, because the core required several steps of manufacture and the picture frame needed careful dimensioning. The bond between the core and clad was in part dependent upon the exactness with which the compact fitted the picture frame. For these and other reasons, the prior procedure gave less assurance of success than the present case.

The mixture of matrix metal and fissionable material may be in powdered form or in the form of a compact for use in the present invention. The powder or compact is placed in a hollow elongated clad metal member and the ends thereof are closed or sealed by compressing the ends or plugging them with slugs of clad metal. The advantage of using a compact is to eliminate the additional step of compacting the powder for a reduction in void space. The compact may be produced from pressing pellets of a powdered mixture of matrix metal and fissionable material into a compact of approximately the same dimensions as the inside of the hollow clad member. The use of a powdered mixture in charging the hollow member involves essentially the same procedure except for slight changes. First one end of the hollow clad member is sealed, the powder is charged into the member, and then compacted by tamping or by means of a vibratory compactor. The void space is reduced to eliminate as much gas as possible from the powdered mixture.

When a compact of matrix metal and fissionable material is used in making the fuel element, both ends of the hollow member may be sealed prior to further processing. The gas content of the compact is not enough to cause any serious difficulty in fabrication. On the other hand, when using a powdered mixture of matrix metal and fissionable material in charging the hollow member, one end may be sealed but the slug in the other end must be held in position without a seal being effected. In this way, gases can escape from the inside of the clad member during the subsequent reduction treatment.

The mixture of matrix metal and fissionable material becomes in the final product a cermet containing the metal as a matrix which interlocks fissionable material within its network. The matrix metal used should be one which has a low thermal neutron absorption cross-section of about 0.5 to 5 barns, and one which can be formed without creating serious problems in the overall manufacturing scheme. The metal can be, for example, stainless steel, aluminum, zirconium, niobium, magnesium, etc. As a powder, the average particle size varies from about 200 to 325 mesh. It should be understood that for the purpose of this invention "a metal" designates generically a single metal or an alloy of two or more metals. The metal used as the clad is preferably the same as the metal used in the mixture or cermet core. By using the same metals, a better bond between the clad and the cermet core is obtained.

The fissionable material is ceramic in nature and is one which is inherently fissionable or can be made so by proper treatment. For example, fissionable materials suitable for my purpose are uranium dioxide, uranosic oxide, plutonium oxide, thorium oxide, etc. The fissionable material is used as a powdered material having approximately the same average particle size as the metal. This promotes uniform distribution for the reason that the ingredients of the powdered mixture have less chance to separate from one another during handling of the assembled unit.

The metal in the powdered mixture containing fissionable material may constitute about 35 to 85% by weight based on the total composition depending upon the metal used and the fuel element design. Uniform distribution of the metal throughout the mixture is sought to insure good bonding between the cermet and clad metal in the final product. In the case of stainless steel, it is preferred to used about 60 to 85% by weight of the metal based on the total mixture, whereas it is preferred to use about 35 to 85% by weight of aluminum in the total mixture.

The clad is preferably composed of an elongated cylindrical portion and two end pieces such as slugs or the like. The main portion or piece may be non-circular in cross-section, for example, it may be elliptical, rectangular, square, or the like. The preferred cross-section for the main piece of the clad is circular. Such pieces are easily handled in the manufacture of the fuel element. The main piece may have an average outer diameter of about 0.350 to 2.0 inches. The thickness of the metal may be about .010 to .050 inch, and the length may be chosen as desired. The dimensions of the main piece may be varied outside the ranges given to suit the needs of the occasion without departing from the scope of the invention.

The assembled fuel element composed of mixture of mental and fissionable material encased within the clad metal is subjected to a forming treatment by which a thin plate is produced. The thin plate has a thickness of about 0.02 to 0.5 inch and a width of about 0.5 to 3.25 inches. The reduction treatment may be accomplished by cold or hot working, with the application of a static force or any like means by which the thickness of the original clad member may be reduced. Reducing the thickness of the clad member brings about work hardness or sets up strains in the material. To avoid damage to the clad member, the reduction treatment is conducted in steps by reducing the thickness about 10 to 25% of the original value and then annealing until the desired thickness is accomplished. The annealing treatment used involves temperatures and treatment times which are well known to those skilled in the art and depends on the matrix and clad metal used and on the size of the assembled element. Annealing is preferably carried out in the absence of oxygen. Annealing can take place, for example, in a vacuum, an inert gas atmosphere such as nitrogen, a reducing atmosphere such as hydrogen or a normally gaseous hydrocarbon, etc. When a stainless steel clad member is used it is preferred that annealing be carried out at about 1100 to 1300° C. for about 10 to 20 minutes depending on the size of the assembly and in the absence of oxygen, for example, a dry hydrogen atmosphere. Annealing an aluminum clad member may be done at about 300 to 400° C. and for about 10 to 20 minutes depending on the size of the assembly exposed to the atmosphere, in a vacuum, an inert atmosphere, etc.

The reduction treatment is conducted as a series of reducing steps alternated by annealing steps. The overall reduction in thickness may be about 40 to 60% of the original value, based on the average diameter or width of the clad member. In the case of soft metal, cold working may be suitable for the reduction treatment. However, in the case of hard metals, it is preferred to use hot working and each reducing step involves about 10 to 15% of the original value.

After the desired thickness of sheet or plate, is attained, the product may be subjected to a sintering treatment. Without sintering, only a mechanical bond exists between the cermet core and the clad metal. Superior fuel elements are obtained by sintering, because in addition to the mechanical bond, a metallurgical bond is formed between the metal clad and the matrix metal. At sintering temperatures, molecular or atomic migration occurs between two separate bodies or particles, forming a linkage between them. From microphotographs, it was found that the boundary between the cermet and the clad was indistinct in a sintered element, indicating substantial transfusion of material therebetween. Suitable sintering conditions for the various metals are well known to those skilled in the art. Conditions vary depending upon the kinds of material being used and the size thereof. For example, for stainless steel, sintering is conducted at about 1150 to 1300° C. for about ½ to 1 hour in the absence of oxygen; whereas, for aluminum, the temperature is about 550 to 600° C. for about ½ to 1½ hours in the absence of oxygen.

To provide a fuller understanding, reference will be had to the following specific examples.

*Example I*

A mixture of aluminum powder having an average particle size of 275 mesh and of powdered uranium dioxide having a similar particle size, the aluminum constituting 70% by weight of the mixture, was poured into an aluminum cylinder having an external diameter of 0.375 inch, a thickness of 0.020 inch, and a length of 12 inches, one end of the cylinder being sealed with an aluminum slug. The cylinder containing the powdered mixture was compacted by means of a vibratory compactor. The open end was covered with an aluminum slug fastened in a way as to permit gas to escape from the interior during the subsequent reduction treatment.

The clad member was cold rolled until 25% reduction in thickness was effected. The reduced member was annealed at 300° C. for ten minutes in a vacuum. This operation was repeated until the flat plate had a thickness of 0.030 inch. At the end of this operation, the flat plate fuel element was sintered at 600° C. for 1 hour in a vacuum. Upon examination of microphotographs of the bond between the cermet core and clad metal the interface was found indistinct, indicating excellent bonding and substantial transfusion of material.

*Example II*

A mixture of powdered stainless steel (average particle size 250 mesh) and of powdered uranium dioxide (similar particle size), 60% by weight of stainless steel based on the mixture, was poured into a stainless steel tube having one end sealed. The tube had an external diameter of 1.0 inch, wall thickness of 0.03 inch, and a length of 12 inches. The powder was compacted, and the open end covered as in Example I. The tube was alternately reduced in thickness by cold rolling and annealing until a flat plate of 0.1 inch thickness was obtained. The average reduction in thickness was about 10% between anneals. Annealing was done at 1100° C. for 10 minutes in dry hydrogen. The flat plate was sintered at 1300° C. for ½ hour in dry hydrogen. The flat plate had an excellent bond between the clad metal and the cermet core.

Having thus provided a description of our invention along with specific examples, it should be understood that the scope is defined by the appended claims.

We claim:

1. A method of manufacturing a flat plate fuel element for a nuclear reactor which comprises the steps of enclosing a core of particulate material in a substantially cylindrical elongated metal sheath to form a tubular assembly, said assembly being sealed so as to permit the escape of gas therefrom, rolling said assembly so as to form a flat plate, and heating the plate so produced to sinter said particulate material and form a metallurgical bond between said core and said sheath, said particulate material consisting of particles of a matrix metal selected from the group consisting of aluminum and stainless steel, and particles of an oxide of a fissionable metal selected from the group consisting of uranium dioxide, uranosic oxide, thorium dioxide and plutonium dioxide, said sheath being composed of the same material as said matrix metal.

2. The method of claim 1 wherein said matrix metal is aluminum and the heating step is performed at a temperature of about 550° C. to 600° C. for at least about ½ hour in the absence of oxygen.

3. The method of claim 1 wherein said matrix metal is stainless steel and the heating step is performed at a temperature of about 1150° C. to 1300° C. for at least about ½ hour in the absence of oxygen.

References Cited in the file of this patent

UNITED STATES PATENTS

| | | |
|---|---|---|
| 2,805,473 | Hardwerk et al. | Sept. 10, 1957 |
| 2,820,751 | Saller | Jan. 21, 1958 |
| 2,936,273 | Utermyer | May 10, 1960 |
| 2,967,141 | Picklesimer et al. | Jan. 3, 1961 |

OTHER REFERENCES

International Conference on Peaceful Uses of Atomic Energy 1955, volume 9, pp. 203–207 and pages 196–202.

KAPL, 1908, Barney et al., Jan. 30, 1958, in particular page 14.